Nov. 14, 1950  E. F. SALSBURY ET AL  2,529,743
POWER TRANSMISSION
Filed April 13, 1946  4 Sheets-Sheet 2

INVENTORS.
ESLEY F. SALSBURY
FORD W. HARRIS
BY HARRIS, KIECH, FOSTER & HARRIS
FOR THE FIRM
ATTORNEYS.

INVENTORS.
ESLEY F. SALSBURY
FORD W. HARRIS
BY HARRIS, KIECH, FOSTER & HARRIS
FOR THE FIRM
ATTORNEYS.

Nov. 14, 1950   E. F. SALSBURY ET AL   2,529,743
POWER TRANSMISSION
Filed April 13, 1946   4 Sheets-Sheet 4

INVENTORS.
ESLEY F. SALSBURY
FORD W. HARRIS
BY HARRIS, KIECH, FOSTER & HARRIS
FOR THE FIRM
ATTORNEYS.

Patented Nov. 14, 1950

2,529,743

UNITED STATES PATENT OFFICE 2,529,743

POWER TRANSMISSION

Esley F. Salsbury and Ford W. Harris, Los Angeles, Calif., assignors to Salsbury Corporation, a corporation of California Application April 13, 1946, Serial No. 661,993

2 Claims. (Cl. 74—230.17)

Our invention relates to variable-speed V-belt power transmissions by which power is transmitted from a driving shaft to a driven shaft which is parallel thereto. It may be employed in a vehicle in which power is transmitted from an internal combustion engine shaft to a driving wheel of the vehicle, and it has special utility when so used in light two- or three-wheeled vehicles in the manner hereinafter described.

In such an application of the invention, the transmission ratio expressed as wheel R. P. M. divided by engine R. P. M. should be a variable, and, as the wheel accelerates from a stationary position with the vehicle at rest to a rotative speed sufficient to drive the vehicle at maximum road speed, this transmission ratio should gradually increase in value, preferably to between three and four times its original value. If, when the vehicle is at rest and the transmission is in low gear, the transmission ratio is 1C, when the vehicle is running at maximum speed or in high gear, the transmission ratio may be 4C, C being a constant depending on wheel diameter and other considerations. A change in transmission ratio from 1C to 4C is somewhat greater than is actually needed.

It is an object of our invention to provide such a power transmission in which no power is transmitted from the engine shaft to the wheel so long as the engine shaft is rotated below a predetermined idling speed when the vehicle is at rest, in which, as soon as the engine shaft is rotated above idling speed, the transmission is in low gear and the transmission ratio is at its minimum value, and in which, as the vehicle accelerates, the transmission ratio increases until the transmission is in high gear and the transmission ratio is at its maximum value.

It is a further object of the invention to provide automatic means for producing these changes in transmission ratio.

Further objects and advantages will be made evident hereinafter.

In the drawings, which illustrate the manner in which our transmission may be applied to the driving of a vehicle:

Figure 1:
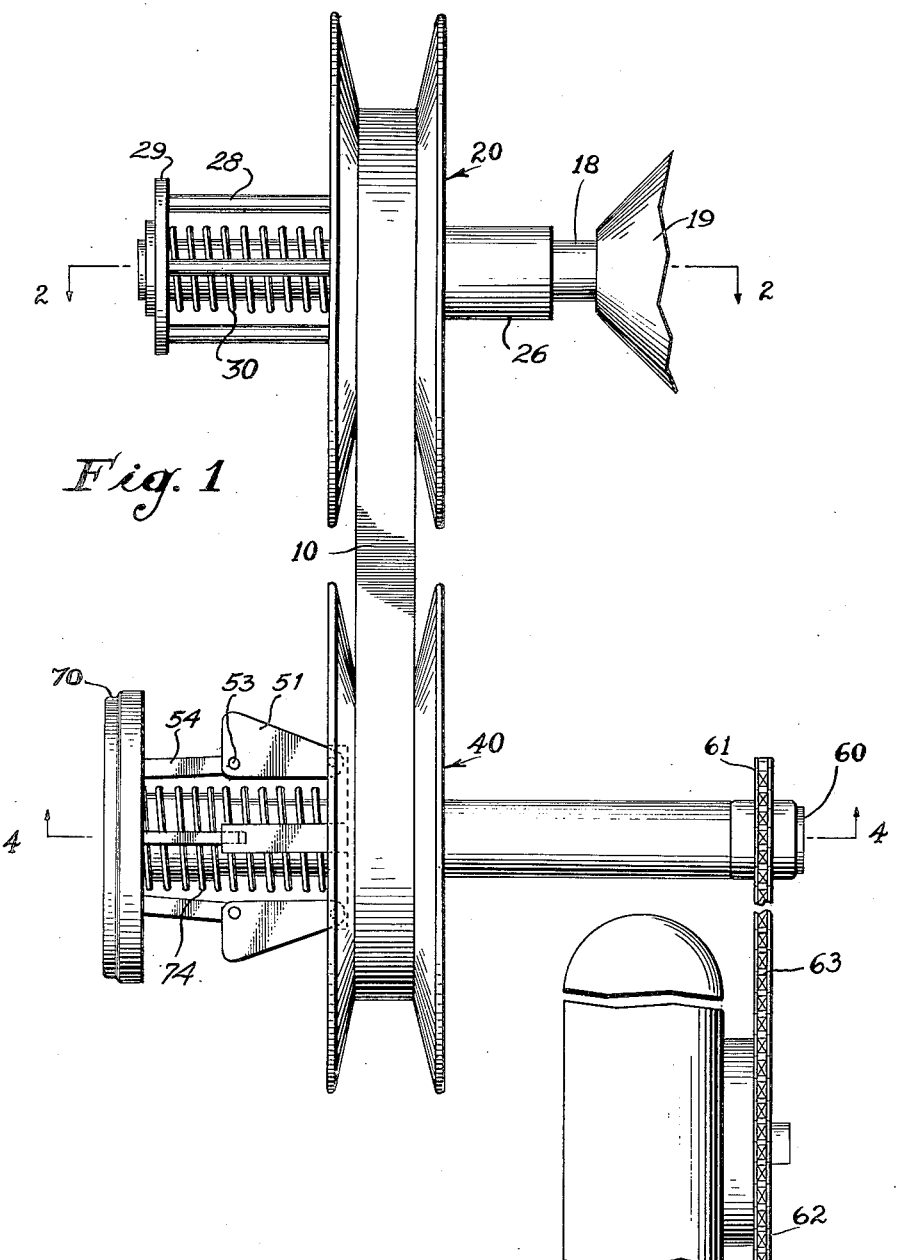
Fig. 1 is a view showing how the transmission may be applied to a vehicle.

Our transmission employs what is known as a V-belt, that is, a flexible belt 10 of trapezoidal section, which, as shown in Fig. 1, partially encircles and transmits power from a driving pulley 20 carried on the shaft 18 of an internal combustion engine 19 to a driven pulley 40. The driven pulley 40 is carried on a countershaft 60 and may be connected to drive this shaft or disconnected therefrom by means of a clutch 70. The countershaft 60 drives a driving wheel 100 of the vehicle through a sprocket 61 fixed on the countershaft 60, a sprocket 62 fixed on the wheel 100, and a chain 63 which connects the sprockets 61 and 62.

The driving pulley 20 and the driven pulley 40 each consist of a fixed disc which is so mounted in relation to its supporting shaft that it cannot move in a direction axial to said shaft, and a movable disc which is so mounted that it can move axially within limits on its shaft, all of the four discs having frusto-conical faces that conform to and grip the sides of the V-belt 10 carried therebetween. It is necessary for smooth operation that the movable disc of one pulley bear against one side of the belt 10 and the movable disc of the other pulley bear against the opposite side of the belt 10.

Figure 2:
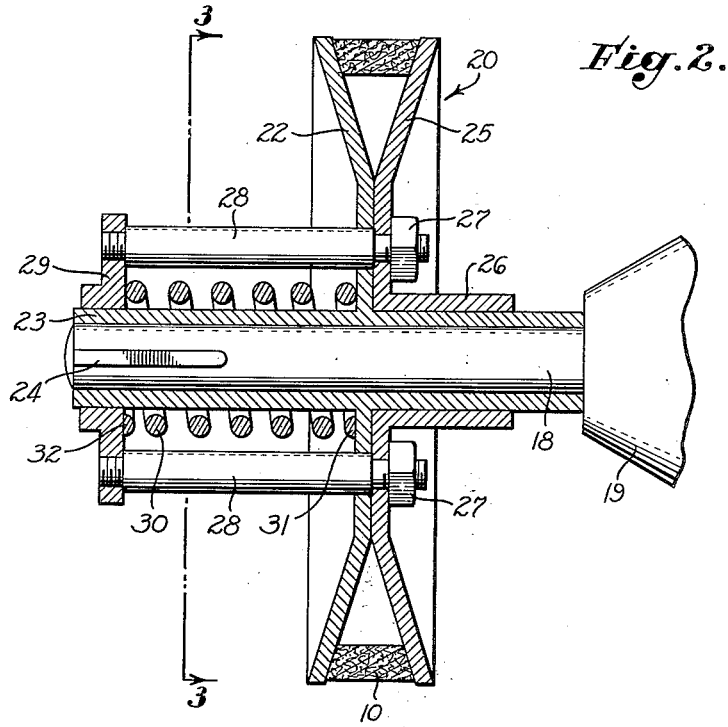
Fig. 2 is a vertical, partly sectional, partly elevational view of the driving pulley of the transmission of our invention showing the component parts thereof in the positions which they assume when the transmission is in high gear.
Figure 2A:
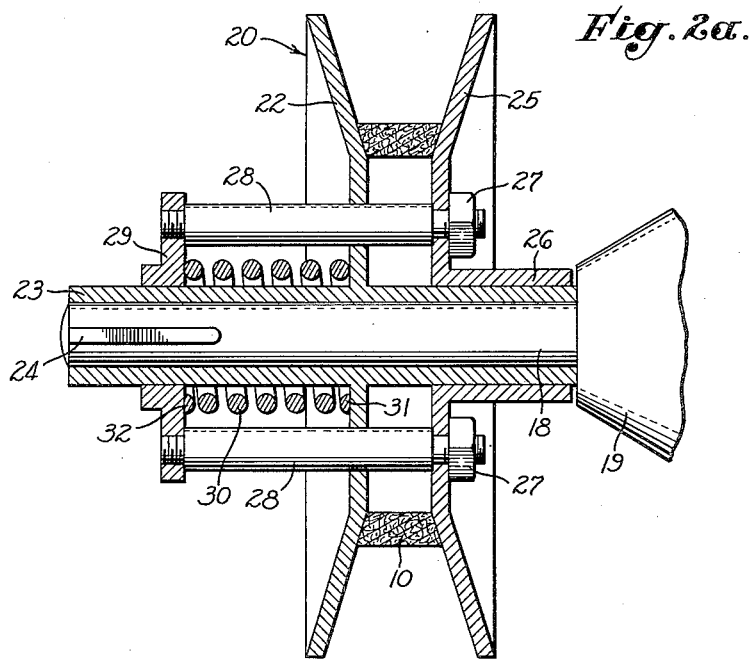
Fig. 2a is a vertical, partly sectional, partly elevational view showing the component parts of the driving pulley of the transmission of our invention in the positions they assume when the transmission is in low gear.

The driving pulley 20 is shown in its high gear position in Fig. 2 and in its low gear position in Fig. 2a, and the belt 10 is shown in the position which it assumes when the driving pulley 20 is in high or low gear. The pulley 20 consists of a fixed driving disc 22, which has a long hub 23 keyed as shown at 24 to the shaft 18, and a movable driving disc 25 which has a hub 26 which slides within limits on the hub 23. Secured by nuts 27 in the movable disc 25 are four rods 28 which pass through holes in the fixed disc 22 and are threaded in a driving pulley abutment 29. A driving pulley compression spring 30 bears at one end 31 on the fixed disc 22 and at its other end 32 on the abutment 29. The spring 30 thus tends to force the abutment 29 away from the fixed disc 22 and, through the rods 28, tends to pull the movable disc 25 toward the fixed disc 22. The spring 30 is made of such strength that the pressure exerted on the sides of the belt 10 never exceeds the pressure at which the belt can be safely operated.

Figure 4A:
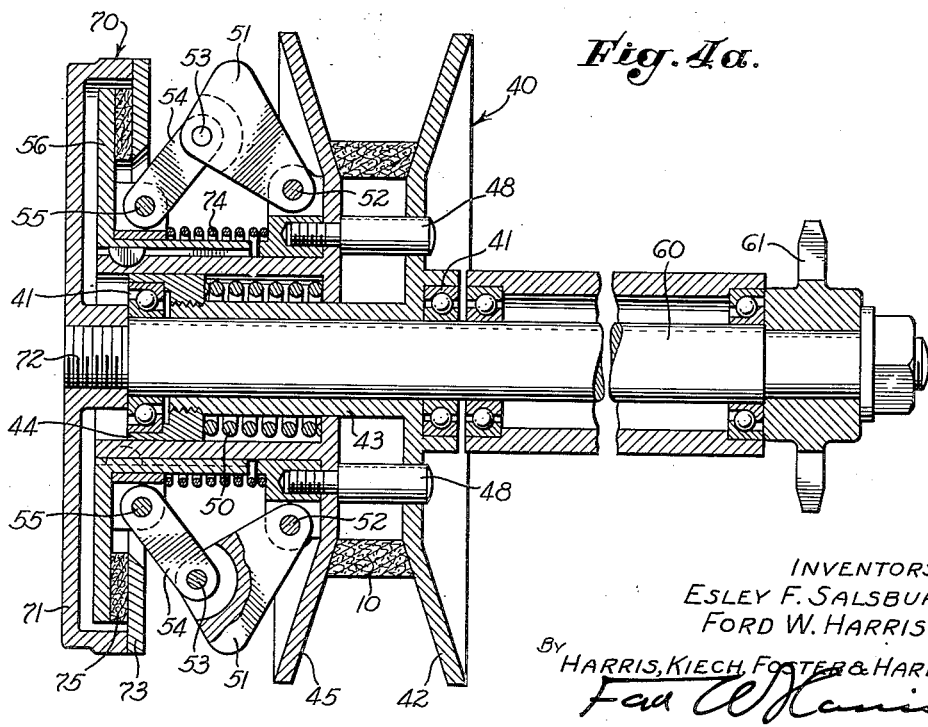
Fig. 4a is a vertical, partly sectional, partly elevational view showing the component parts of the driven pulley of the transmission in the positions which they assume when the transmission is in high gear; and, Fig. 5 is a partly sectional, partly elevational view taken on the broken line 5—5 of Fig. 4.
Figure 4:
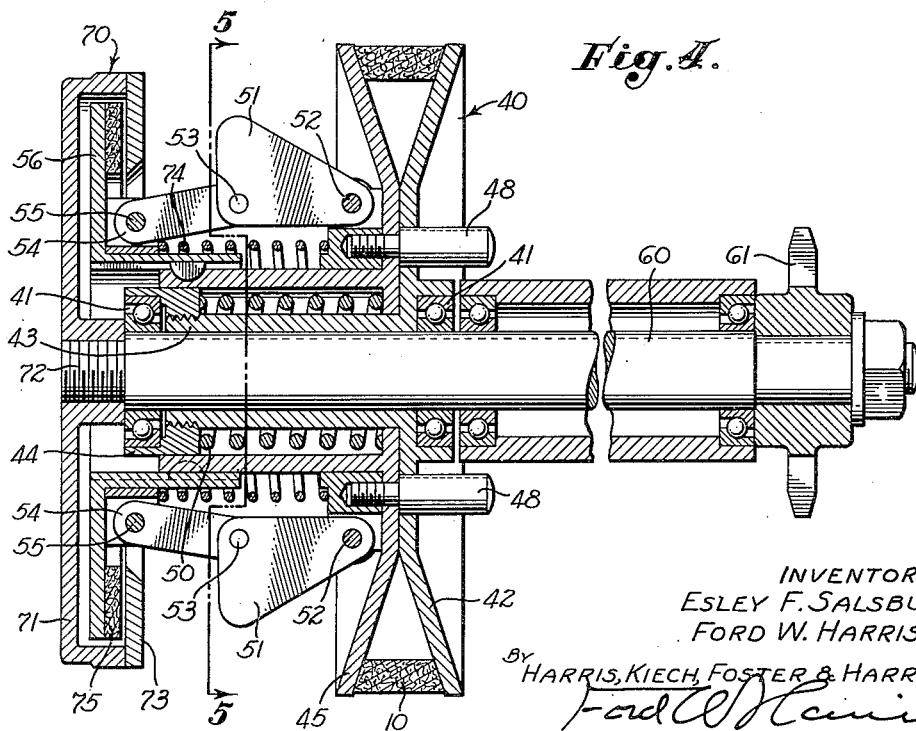
Fig. 4 is a vertical, partly sectional, partly elevational view showing the component parts of the driven pulley of the transmission of our invention in the positions they assume when the transmission is in low gear.
Figure 3:
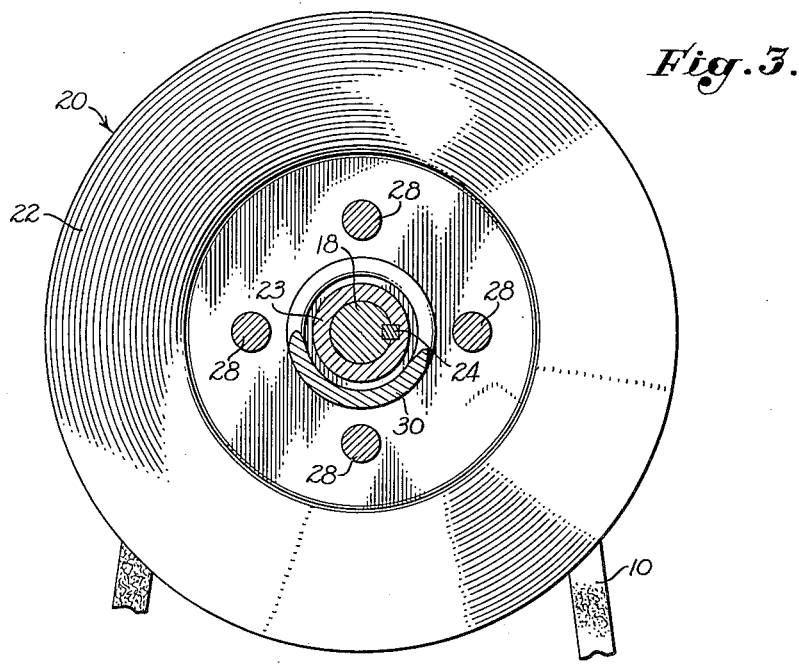
Fig. 3 is a side elevational view of the driving pulley of the transmission of our invention taken on the broken line 3—3 of Fig. 2.
Figure 5:
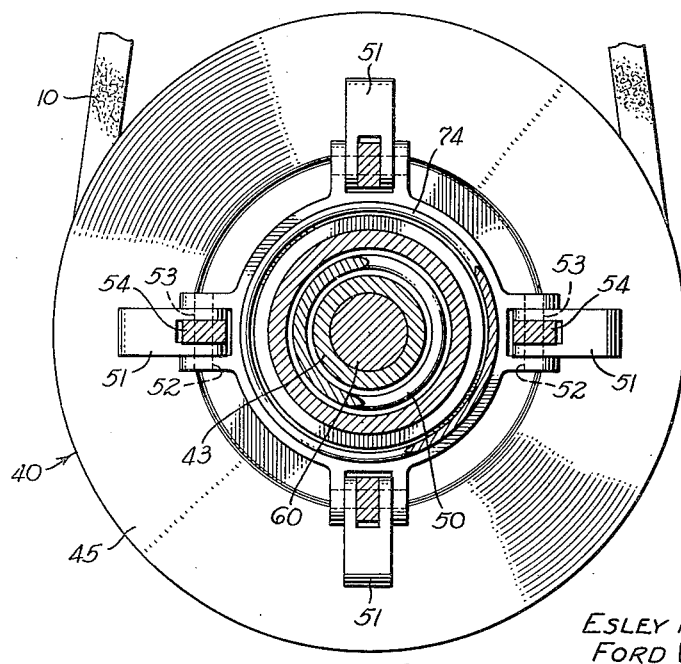

In Fig. 4 the driven pulley 40 of the transmission is shown in the position which it assumes when the transmission is in low gear and when the driving pulley 20 is in low gear. By a comparison of Fig. 4 with Fig. 2a, it can be seen that the V-belt 10 is closest to the center of rotation of the driving pulley 20 when said driving pulley is in low gear and is furthest from the center of rotation of the driven pulley 40 when the transmission is in low gear. Therefore, when the driving pulley 20 is in the low gear position, the movable disc 25 thereof has shifted to the right, as seen in Fig. 2a, the maximum distance permissible and when the driven pulley 40 is in low gear, the fixed and movable discs 42 and 45, respectively, are in close contiguity to each other. When the discs of the driven pulley 40 are in close contiguity to each other, as illustrated in Fig. 4, the V-belt 10 is at its furthest point from the center of rotation of the driven pulley. Due to the rods 28, which pass through the movable disc 25, the movable disc 25 and the fixed disc 22 always rotate together, and, since the hub 23 of the fixed disc 22 is keyed to the shaft 18, both discs turn at all times at the same rotative speed as the engine.

The driven pulley 40 is shown in Figs. 4 and 4a. The fixed driven disc 42 has a hub 43 which is mounted through ball bearings 41 on the countershaft 60 so that the driven pulley 40 can rotate on the countershaft without driving the countershaft. Threaded on the end of the hub 43 is a collar 44. The bearings 41 are so placed and mounted that the fixed disc 42 cannot move in a direction axial to the countershaft 60. A movable driven disc 45 is free to move within limits in a direction axial to the countershaft 60. Three rods 48 are threaded in the movable disc 45 and project through the fixed disc 42 so that these discs always rotate together. A driven pulley major compression spring 50 bears at one end on the collar 44 and at the other end on the movable disc 45 and tends to force the movable disc 45 toward the fixed disc 42. The driven pulley spring 50 is much stronger than the driving pulley spring 30 of the driving pulley 20, and whenever it is not restrained by a centrifugally actuated mechanism hereinafter described, the spring 50 forces the driven discs 42 and 45 together and through the belt 10 forces the discs of the driving pulley apart against the force of the spring 30. Four centrifugally actuated mechanisms are provided in the driven pulley 40 spaced ninety degrees apart. Each consists of a weighted link 51 pivoted at 52 to the movable disc 45 and at 53 to a link 54 which is pivoted at 55 to a clutch member 56. The clutch member 56 slides upon and is slidably keyed to the hub of the movable driven disc 45 so that it always rotates with the driven pulley 40. The weighted links 51 not only govern the transmission ratio, but they also actuate the clutch 70.

The member 70 consists of a primary clutch driven member 71 which is rigidly secured at 72 to the countershaft 60. The member 56, which is the clutch driving member, projects between a friction plate 73 fixed on the member 71 and the web of the clutch driven member 71 and carries a friction disc 75. With all the parts of the vehicle at rest, as shown in Fig. 4, the friction disc 75 is held out of contact with the friction plate 73 by a minor clutch spring 74, which is a compression spring, forcing the member 56 to the left, as seen in Fig. 4, or away from the movable disc 45. This spring 74 is compressed as the weighted links 51 are forced outwardly by centrifugal force, and the spring is made sufficiently strong to hold the clutch out of engagement until the engine reaches idling speed and the driven pulley 40 reaches a speed corresponding to the engine speed divided by the transmission ratio. Since the spring 74 is much weaker than the spring 50, the clutch 70 is always pulled into engagement before the discs of the driven pulley start to separate. Thereafter, with the clutch engaged, the weights 51 pull the driven discs apart as the speed of the countershaft increases. With the clutch 70 engaged, the driven pulley 40 rotates at a speed proportional to the wheel and vehicle speed, the centrifugal force exerted by the weighted links 51 being proportional to the square of the vehicle speed. When the engine is rotating below idling speed, the clutch 70 is disengaged from the countershaft 60 and no driving force is applied to the wheels. Both the driving pulley 20 and the driven pulley 40 rotate, but the spring 50 overcomes the spring 30, and the transmission ratio is at its maximum value prior to the time the vehicle starts. As the speed of the driven pulley increases due to an increase in the engine speed above idling speed, the clutch 70 first engages, this engagement being controlled solely by the speed of the driven pulley 40, the transmission being in low gear. After the clutch 70 engages, the transmission ratio is thereafter governed by and proportional to vehicle speed. At low vehicle speeds the transmission ratio has a minimum value, and as the vehicle speed increases the value of the transmission ratio gradually rises to its maximum value. The clutch 70 can never disengage until the transmission ratio again falls to its minimum value, that is, until the driven discs are in their low gear position. If the engine is "killed" or deprived of driving power, for example, by shutting off the ignition, the engine will be driven until the transmission reaches its minimum ratio value; that is, the transmission shifts into low gear position, and the vehicle speed falls below a speed at which the engine is driven at idling speed.

One of the principal advantages of placing the automatic centrifugal clutch between the transmission and the wheel, rather than placing it between the transmission and the engine, is that the proper shifting of the transmission from high gear to low gear is facilitated. The shifting from high gear to low gear requires an appreciable time, and can only occur when the pulleys are rotating. It also occurs much faster when there is little or no power being transmitted than when full load is carried by the belt. By always leaving the transmission connected to the engine so that it can rotate with the engine even when the clutch is released, since when the clutch is released the belt carries no load, the transmission shifts very quickly, and there is no possibility of the transmission being left in high gear if the vehicle is stopped suddenly as by the forceful application of the brake.

We claim as our invention:

1. In a transmission, a pulley and clutch assembly through which power may be transmitted from a V-belt to a shaft comprising: a V-belt of trapezoidal section; a shaft; a fixed disc and a movable disc, said discs having oppositely inclined frusto-conical faces which are so placed as to grip the sides of a V-belt, said discs being so connected that they are forced to rotate together and so mounted that they can rotate freely on said shaft, said fixed disc being restrained so that it cannot move axially with relation to said shaft and said movable disc being so mounted that it can move axially of said shaft within limits toward or away from said fixed disc; a major compression spring so mounted as to force said discs toward each other; a primary clutch member rigidly mounted on said shaft and having a primary clutch face; a secondary clutch member having a secondary clutch face so placed that it can be brought into frictional engagement with said primary face, said secondary clutch member being so mounted on an extension of said secondary disc that it can move axially within limits toward or away from said secondary disc; a minor compression spring which exerts an axial force materially less than the axial force exerted by the major spring, said minor spring being so mounted that it forces said secondary disc and said secondary clutch member apart; and a centrifugally actuated mechanism so placed as to pull said secondary disc toward said secondary clutch member, said centrifugally operated mechanism having a sufficient range to permit the secondary clutch face to be forced out of contact with the primary clutch face when the centrifugal member is in its retracted position and the two discs are nearest each other, and to permit the secondary clutch face to engage the primary clutch face before the discs start to be pulled apart by the centrifugally operated mechanism.

2. In a transmission, a pulley and clutch assembly through which power may be transmitted from a V-belt to a shaft comprising: a V-belt of trapezoidal section; a shaft; a fixed disc and a movable disc, said discs having oppositely inclined frusto-conical faces which are so placed as to grip the sides of a V-belt, said discs being so connected that they are forced to rotate together and so mounted that they can rotate freely on said shaft, said fixed disc being restrained so that it cannot move axially with relation to said shaft and said movable disc being so mounted that it can move axially of said shaft within limits toward or away from said fixed disc; a major compression spring so mounted as to force said discs toward each other; a primary clutch member rigidly mounted on said shaft and having a primary clutch face; a secondary clutch member having a secondary clutch face so placed that it can be brought into frictional engagement with said primary face, said secondary clutch member being so mounted on an extension of said secondary disc that it can move axially within limits toward or away from said secondary disc; a minor compression spring which exerts an axial force materially less than the axial force exerted by the major spring, said minor spring being so mounted that it forces said secondary disc and said secondary clutch member apart; a plurality of weights, each weight being so pivoted on one of said secondary members that it must rotate at all times with said secondary member; and a plurality of links, each link being pivoted at one end on one of said weights and pivoted at the other end on the other of said secondary members, each of these links being of sufficient length to permit the secondary clutch face to be forced out of contact with the primary clutch face when the centrifugal member is in its retracted position and the two discs are nearest each other, and to permit the secondary clutch face to engage the primary clutch face before the discs start to be pulled apart by the centrifugally operated mechanism.

ESLEY F. SALSBURY.
FORD W. HARRIS.

REFERENCES CITED

The following references are of record in the file of this patent:

UNITED STATES PATENTS

| Number | Name | Date |
|---|---|---|
| 2,151,987 | Perrine | Mar. 28, 1939 |
| 2,215,831 | Heyer | Sept. 24, 1940 |
| 2,260,797 | Burns | Oct. 28, 1941 |
| 2,378,549 | Gruenhagen | June 19, 1945 |

FOREIGN PATENTS

| Number | Country | Date |
|---|---|---|
| 170,470 | Great Britain | Oct. 27, 1921 |